United States Patent
Rees et al.

(10) Patent No.: US 12,259,234 B2
(45) Date of Patent: Mar. 25, 2025

(54) METHOD OF CALIBRATING A SURFACE SENSING DEVICE, CORRESPONDING CALIBRATING PROGRAM FOR A CONTROL COMPUTER AND CORRESPONDING CALIBRATION KIT

(71) Applicant: RENISHAW PLC, Wotton-under-Edge (GB)

(72) Inventors: Martin Simon Rees, Bristol (GB); Andrew Geoffrey Butter, Stroud (GB); David Sven Wallace, Stroud (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 18/130,447

(22) Filed: Apr. 4, 2023

(65) Prior Publication Data

US 2023/0236010 A1 Jul. 27, 2023

Related U.S. Application Data (63) Continuation of application No. 16/483,692, filed as application No. PCT/GB2018/050387 on Feb. 13, 2018, now Pat. No. 11,650,050.

(30) Foreign Application Priority Data

Feb. 14, 2017 (GB) .................................... 1702391

(51) Int. Cl.
*G01B 21/04* (2006.01)
*G01B 5/012* (2006.01)
(Continued)

(52) U.S. Cl.
CPC ............ *G01B 21/042* (2013.01); *G01B 5/012* (2013.01); *G01B 7/012* (2013.01); *G01B 11/007* (2013.01)

(58) Field of Classification Search
CPC ...... G01B 21/042; G01B 5/012; G01B 7/012; G01B 11/007
See application file for complete search history.

(56) References Cited

U.S. PATENT DOCUMENTS 4,369,581 A 1/1983 Lenz
4,776,212 A * 10/1988 Parsons ................... G01B 5/28
73/105

(Continued)

FOREIGN PATENT DOCUMENTS

CN 101512285 A 8/2009
CN 204854519 U 12/2015
(Continued)

OTHER PUBLICATIONS

Hart et al., "Kinematic coupling interchange", Precision Engineering 28 (2004) 1-15 (Year: 2004).*
(Continued)

Primary Examiner — Tung S Lau
(74) Attorney, Agent, or Firm — Oliff PLC (57) ABSTRACT

A surface sensing device is mounted on an articulating probe head of a coordinate measuring machine. The device includes an elongate probe holder which is rotatable about an axis. An elongate sensing module includes a surface finish or surface roughness probe with a stylus tip. This is connected to the probe holder via an adjustable knuckle joint. To determine the geometry of the surface sensing device, including the tip normal and drag vector of the stylus tip, the orientations of the probe holder and the sensing module are determined by probing points which are spaced along their lengths, using a separate probe.

18 Claims, 5 Drawing Sheets

(51) Int. Cl.
*G01B 7/012* (2006.01)
*G01B 11/00* (2006.01)

(56) References Cited

U.S. PATENT DOCUMENTS

| | | | |
|---|---|---|---|
| 4,819,339 A | 4/1989 | Kunzmann et al. | |
| 4,888,877 A | 12/1989 | Enderle et al. | |
| 5,579,753 A * | 12/1996 | Chiuminatta | B23D 59/001 |
| | | | 125/13.01 |
| 5,615,489 A | 4/1997 | Breyer et al. | |
| 6,298,312 B1 | 10/2001 | Chen | |
| 7,640,674 B2 | 1/2010 | Ferrari et al. | |
| 8,006,399 B2 | 8/2011 | Wallace et al. | |
| 8,468,672 B2 | 6/2013 | Wallace | |
| 8,479,403 B2 | 7/2013 | Jordil et al. | |
| 9,383,198 B2 | 7/2016 | Sagemueller et al. | |
| 9,726,482 B2 | 8/2017 | Iseli et al. | |
| 9,772,182 B2 | 9/2017 | Am Weg et al. | |
| 9,874,439 B2 * | 1/2018 | Bucher | G01B 11/303 |
| 10,073,435 B2 | 9/2018 | Sagemueller et al. | |
| 10,591,271 B2 * | 3/2020 | Held | G01B 5/012 |
| 2005/0234671 A1 | 10/2005 | Morfino | |
| 2007/0016386 A1 | 1/2007 | Husted | |
| 2008/0239327 A1 | 10/2008 | Bryll | |
| 2009/0024343 A1 | 1/2009 | Balsamo et al. | |
| 2009/0183610 A1 | 7/2009 | Maxted et al. | |
| 2009/0271996 A1 | 11/2009 | Ferrari et al. | |
| 2010/0132432 A1 | 6/2010 | Wallace et al. | |
| 2010/0286812 A1 | 11/2010 | Slettemoen et al. | |
| 2011/0192042 A1 | 8/2011 | McMurtry et al. | |
| 2011/0270570 A1 * | 11/2011 | Jordil | G01B 5/012 |
| | | | 702/150 |
| 2014/0157861 A1 | 6/2014 | Jonas et al. | |
| 2014/0236520 A1 | 8/2014 | Engel et al. | |
| 2015/0052767 A1 | 2/2015 | Sagemueller et al. | |
| 2015/0260859 A1 | 9/2015 | Christoph et al. | |
| 2015/0285616 A1 | 10/2015 | Jordil | |
| 2015/0345937 A1 | 12/2015 | Seitz et al. | |
| 2015/0345940 A1 | 12/2015 | Sagemueller et al. | |
| 2017/0045357 A1 | 2/2017 | Lummes et al. | |
| 2017/0191815 A1 | 7/2017 | Chardonnens et al. | |
| 2017/0370690 A1 | 12/2017 | Held et al. | |
| 2018/0018778 A1 | 1/2018 | Haverkamp et al. | |
| 2018/0173209 A1 | 6/2018 | Iseli et al. | |

FOREIGN PATENT DOCUMENTS

| | | | | |
|---|---|---|---|---|
| CN | 105556253 A | | 5/2016 | |
| CN | 105716559 A | | 6/2016 | |
| CN | 106477027 A | * | 8/2016 | B64C 25/26 |
| DE | 4424871 A1 | | 1/1996 | |
| DE | 19947374 A1 | | 5/2001 | |
| DE | 102012017015 A1 | | 2/2014 | |
| DE | 102013200210 B3 | | 6/2014 | |
| DE | 102013205456 A1 | | 10/2014 | |
| DE | 102015205566 A1 | | 9/2016 | |
| DE | 102015205567 A1 | | 9/2016 | |
| DE | 102015205738 A1 | | 10/2016 | |
| EP | 0429857 A1 | | 6/1991 | |
| EP | 0615110 A1 | | 9/1994 | |
| EP | 1975556 A1 | * | 10/2008 | G01B 11/002 |
| EP | 2248636 A1 | | 11/2010 | |
| EP | 2835702 B1 | | 4/2016 | |
| EP | 2390622 B1 | | 10/2018 | |
| ES | 2500815 A1 | | 9/2014 | |
| JP | H05-162051 A | | 6/1993 | |
| JP | H10-47943 A | | 2/1998 | |
| JP | 2002-225706 A | | 8/2002 | |
| JP | 2011-237428 A | | 11/2011 | |
| WO | 93/08449 A1 | | 4/1993 | |
| WO | 02/090879 A2 | | 11/2002 | |
| WO | 05/071350 A1 | | 8/2005 | |
| WO | 06/128733 A2 | | 12/2006 | |
| WO | 2008/029094 A1 | | 3/2008 | |
| WO | 2015/162431 A1 | | 10/2015 | |

OTHER PUBLICATIONS

Renishaw-Autochange System User's Guide; H-1000-5090-05-A; Apr. 2007; pp. 1-69.
Renishaw-Autochange System Installation and Programmer's Guide; H-1000-6010-07-A; Apr. 2001; pp. 1-89.
Jul. 12, 2017 Search Report issued in British Patent Application No. GB1702391.2.
Apr. 9, 2018 Search Report issued in International Patent Application No. PCT/GB2018/050387.
Apr. 9, 2018 Written Opinion of the International Searching Authority issued in International Patent Application No. PCT/GB2018/050387.
"New sensor enables all measurements on one coordinate measuring machine," https://www.edn.com/new-sensor-enables-all-measurements-on-one-coordinate-measuring-machine/, Jul. 14, 2015.
"PK1 knuckle joint," https://www.renishaw.com/cmmsupport/knowledgebase/en/pk1-knuckle-joint-22183, available as of Aug. 4, 2020 (accessed Jul. 7, 2022).
"M4 rotary knuckle, L 33 mm," https://www.renishaw.com/shop/Product.aspx?Product=A-5003-4689, available as of Oct. 8, 2017 (accessed Jul. 8, 2022).
"SP80—ultra-high accuracy scanning probe". Renishaw, Brochure. 2012.
"Styli for Zeiss applications". Renishaw, Technical Specifications, H-1000-3036-01-A, 2004.
"Styli for Zeiss applications". Renishaw, Technical Specifications, H-1000-3036-04-A, 2011.
U.S. Appl. No. 16/483,692, filed Aug. 5, 2019 in the name of Rees et al.

* cited by examiner

METHOD OF CALIBRATING A SURFACE SENSING DEVICE, CORRESPONDING CALIBRATING PROGRAM FOR A CONTROL COMPUTER AND CORRESPONDING CALIBRATION KIT

RELATED APPLICATIONS

This application is a continuation of U.S. patent application Ser. No. 16/483,692, filed Aug. 5, 2019, which is a national stage entry of PCT/GB2018/050387, filed Feb. 13, 2018, which in turn claims priority to British Patent Application No. GB 1702391.2, filed Feb. 14, 2017. The contents of these prior applications are hereby incorporated by reference in their entireties.

FIELD OF THE INVENTION

The present invention relates to a surface sensing device for use in position determining apparatus or machine such as, for example, a co-ordinate-measuring machine (CMM), a scanning machine, a machine tool or an inspection/measurement robot. More particularly the invention relates to the calibration of such a surface sensing device.

DESCRIPTION OF PRIOR ART

Such a position determining apparatus or machine may be used for measuring a workpiece, and typically comprises a member which is movable in three coordinate directions X,Y,Z relative to a table on which the workpiece is supported. Movement of the member in each of the directions X,Y,Z is measured by transducers on the machine. A surface sensing device or probe provided on the movable member produces a signal indicating the relationship between it and the workpiece surface to be measured. The position of the surface may thus be determined. In an alternative machine, for example some types of machine tool, the table moves in X and Y and the movable member moves in Z.

Some types of contact probe, e.g. touch trigger probes and contact scanning probes, act in three dimensions. Typically they can approach a workpiece surface in any direction within the X,Y,Z coordinate system of the machine's transducers, and they have a deflectable stylus with a workpiece-contacting tip. Prior to making measurements with such probes, it is usual to perform a kind of calibration known as "datuming". This involves touching the stylus tip against a datum surface (such as a datum sphere), in order to determine a repeatable location of the stylus tip in the X,Y,Z coordinate measurement system of the machine.

In a flexible measurement system, in order to access different workpiece surfaces, the probe may be mounted on a CMM via a motorised articulating head, by which it is rotatable about two mutually orthogonal axes of rotation. The machine and the head may operate under computer control.

Probes (or surface sensing devices) may be exchangeable. When not in use, they are stored in respective storage ports of a storage rack. When required for measurement, the articulating head can automatically pick up a probe from a storage port of the rack, and then dock it back in the storage port afterwards, all under computer control. The present applicants Renishaw plc sell such a system under the trade mark Autochange. To enable alignment of the articulating head with respect to the rack, the Autochange rack is fitted with a fixed touch trigger probe. When setting up the rack, surfaces of the head are touched against the rack's probe. This establishes a spatial relationship between the head and the ports of the rack, to ensure their alignment.

U.S. Pat. No. 8,006,399 (Wallace et al) and U.S. Pat. No. 8,468,672 (Wallace) describe a surface sensing device. In order to access different workpiece surfaces, it is mounted on a CMM via an articulating head, by which it is rotatable about two mutually perpendicular axes of rotation. The surface sensing device may comprise a surface finish probe which senses the surface unidirectionally, or another type of unidirectional (single axis) probe, for example an optical probe such as a laser spot or laser line probe. To enable such a unidirectional probe to address differently-oriented surfaces, it has a third axis of rotation, enabling it to be rotated manually. The third axis of rotation may be aligned with a generally longitudinal axis of the surface sensing device, which may sense the surface in a direction transverse to or offset from the third axis. Alternatively, the surface sensing device may be arranged at an angle to the third axis of rotation.

However, this third axis of rotation only enables surfaces to be addressed in certain possible orientations. There is also a problem of datuming or calibrating the geometry of such a surface sensing device.

SUMMARY OF THE INVENTION

The present invention provides a method of calibrating a surface sensing device for use in position determining apparatus, the surface sensing device comprising one or more elongate members mounted to the position determining apparatus, and a surface sensing element mounted to the apparatus via the one or more elongate members, the method comprising probing at least one of the elongate members with a separate probe to determine its orientation.

One of the one or more elongate members may be connected to a pivotable joint whereby it can be set at a desired angle.

The separate probe may probe one or more side locations of the elongate member or members. The elongate member may be probed a plurality of times by the same probe.

There may be first and second elongate members, and a pivotable joint connecting the first and second elongate members whereby the second member can be set at a desired angle relative to the first member, the first elongate member being connected to the position determining apparatus, and the surface sensing element being carried by the second elongate member.

Preferably, the probing comprises probing at least the second elongate member with the separate probe to determine its orientation. The method may also comprise probing the first elongate member with a separate probe to determine its orientation, and then determining the angle of the second member relative to the first member.

Suitably, the or each elongate member is probed at at least two positions spaced along its length. Preferably the or each elongate member is probed at at least six positions. This gives a more accurate indication of its orientation and location in space.

In a preferred embodiment, the surface sensing device is one which senses unidirectionally, e.g. a surface finish or surface roughness probe. The surface sensing element may be a stylus with a tip, mounted to deflect in a normal direction when the stylus tip is dragged across a surface, and connected to a transducer to measure the deflection of the stylus thereby to determine surface finish or surface roughness.

The method may include determining the normal direction of the stylus tip and/or the direction in which the tip is dragged along the surface. This may be determined from the orientation(s) of the one or more elongate elements.

The method may also include determining an offset which describes the location of the stylus tip relative to the position determining apparatus. This may be calculated from the orientation(s) and the length(s) of the one or more elongate members. Alternatively, it may be determined by probing the surface sensing device in the vicinity of the stylus tip with a separate probe.

The surface sensing device may include a rotary joint configured to rotate the elongate member connected to the position determining apparatus, generally about the longitudinal axis of the elongate member. The method may include determining the orientation of the axis of rotation (which may not coincide exactly with the orientation of the elongate member). The rotary joint may have a motor for rotating the elongate member.

The surface sensing device may be mounted to the position determining apparatus via an articulating head, configured to rotate the surface sensing device about two mutually orthogonal axes. The articulating head may include motors for rotating the surface sensing device about the mutually orthogonal axes.

The invention also provides a program for a computer control of a position determining apparatus, configured to perform any of the above methods.

A further aspect of the invention provides a kit for use with a position determining apparatus, including a surface sensing device comprising one or more elongate members for mounting to the position determining apparatus, a surface sensing element for mounting to the apparatus via the one or more elongate members, and a program configured to perform any of the above methods.

Programs discussed herein may be provided on any suitable machine readable medium, including memory discs, memory sticks, memory cards or a local or remote server from which the program can be downloaded.

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
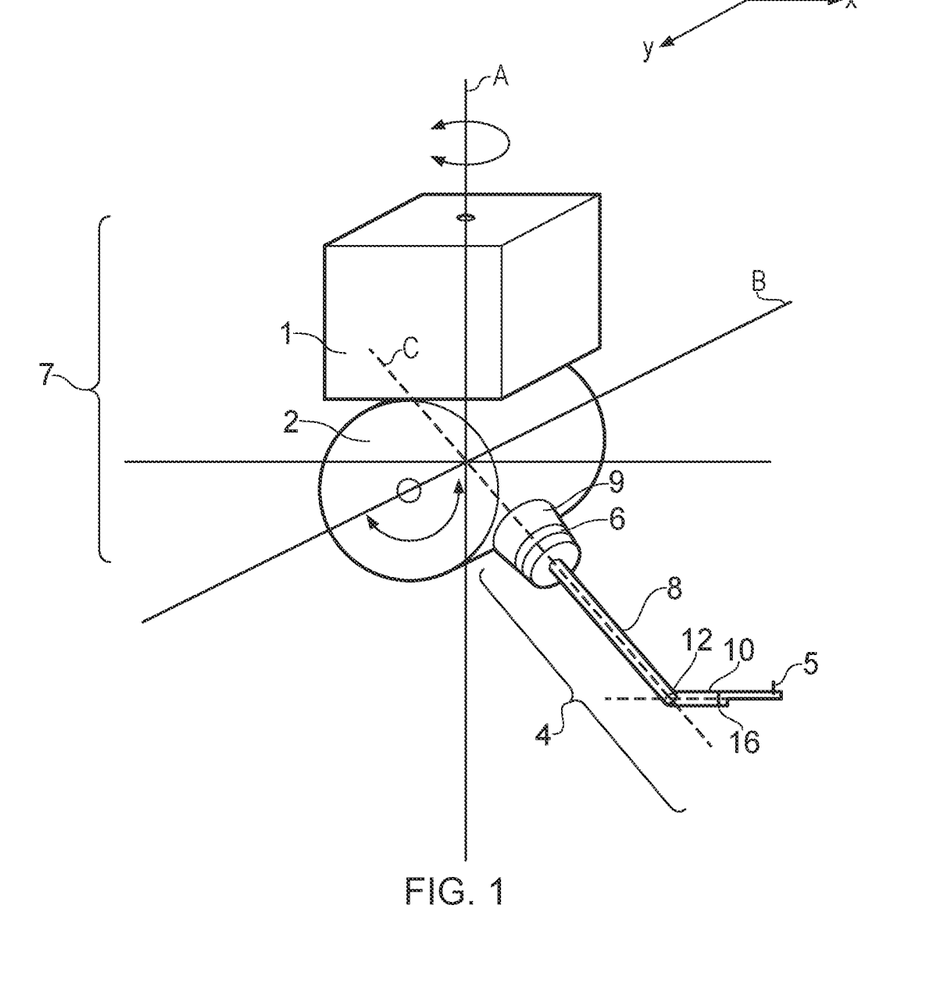
FIG. 1 is an isometric view of a surface sensing device mounted on an articulating probe head.
Figure 2:
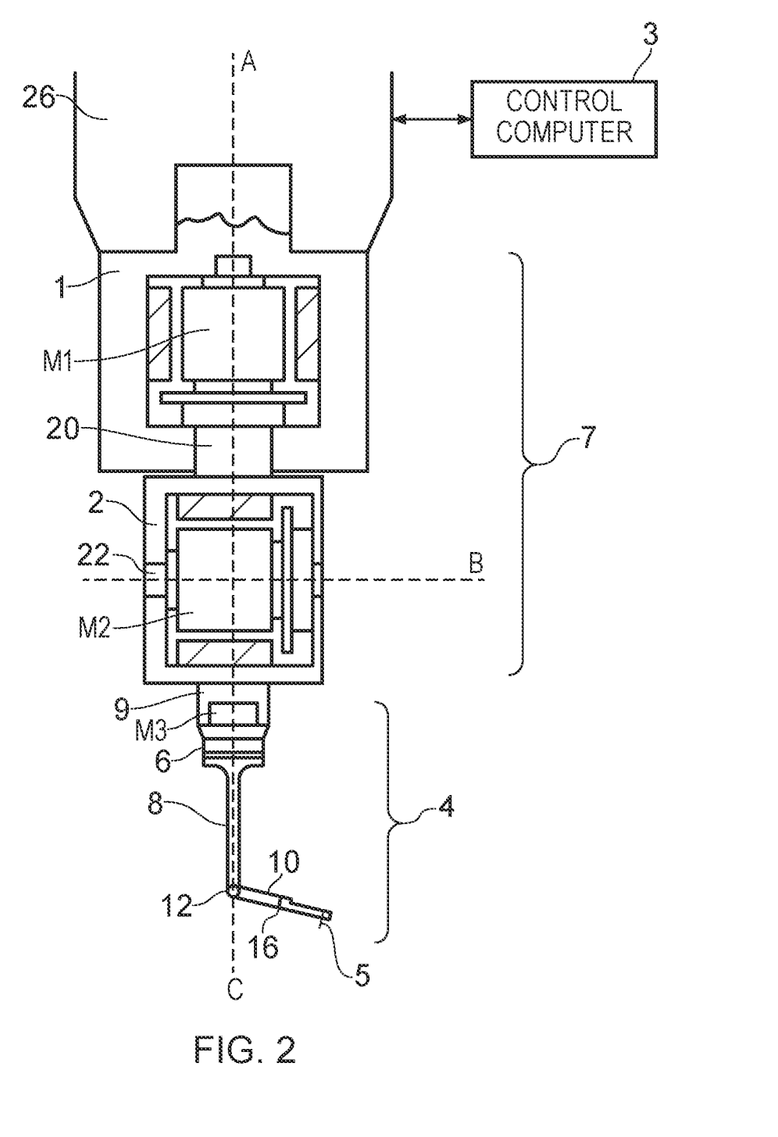
FIG. 2 shows a section through axes A and B of FIG. 1.

FIG. 1 shows an articulating probe head 7, which supports a surface sensing device 4 for rotation about two mutually orthogonal axes of rotation A, B. FIG. 2 shows a section through the articulating head 7 and the surface sensing device 4 in a plane defined by the axes A, B.

Figure 4:
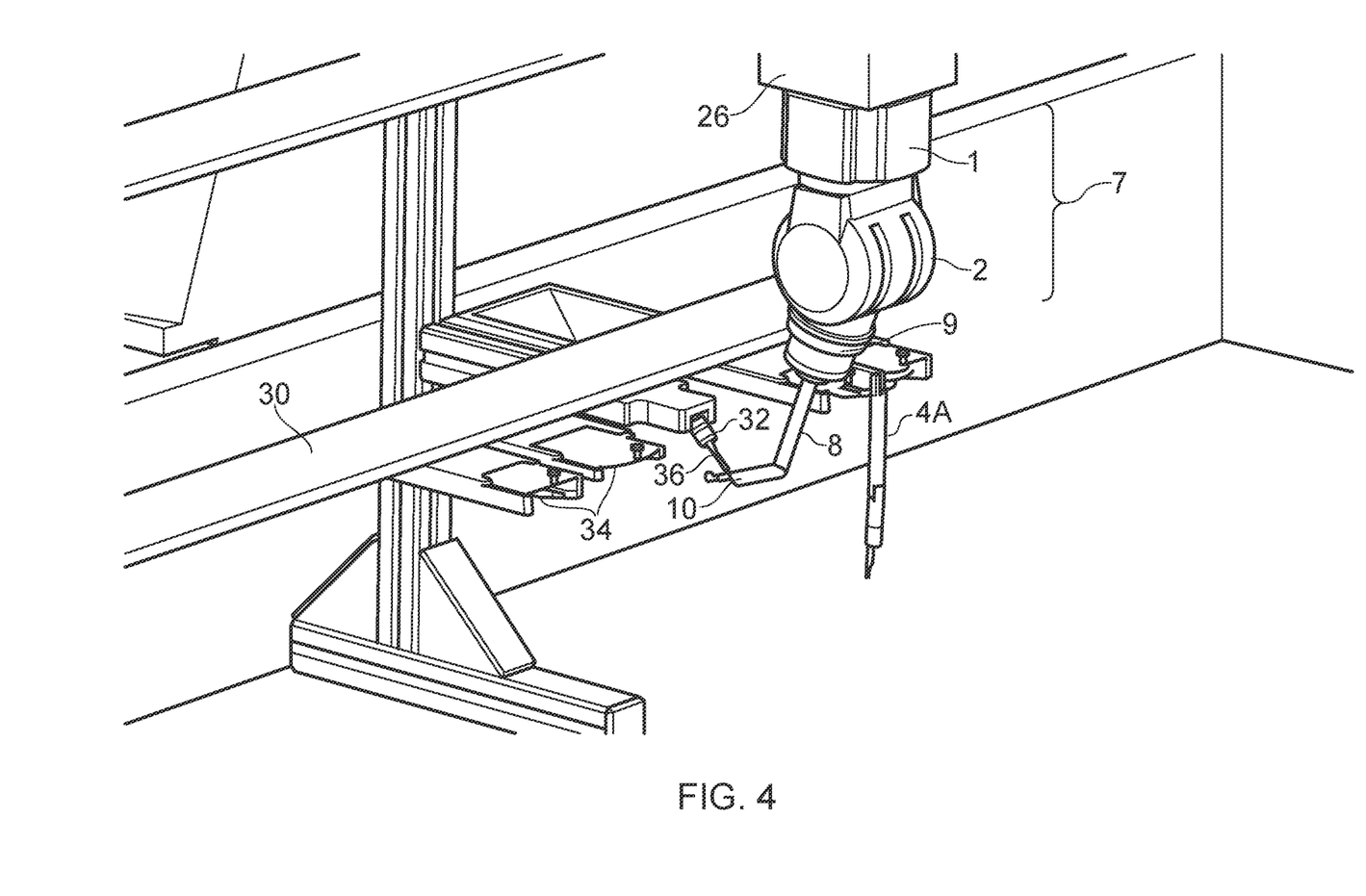
FIGS. 4-7 show the surface sensing device and articulating probe head mounted on a coordinate measuring machine (CMM).

The articulating probe head 7 comprises first and second housing members 1 and 2 respectively. The first housing member 1 is adapted for attachment to a position determining apparatus, for example to a movable arm 26 of a CMM as seen in FIG. 4. The CMM moves the arm 26 in three linear dimensions X,Y,Z. As shown in FIG. 2, the housing member 1 houses a motor M1 for effecting angular displacement of a first shaft 20 about the first axis A. Attached to the first shaft 20 is the second housing member 2, which houses a motor M2 for effecting angular displacement of a second shaft 22 about the second axis B. The surface sensing device 4 is attached to the second shaft 22 for rotation therewith. The CMM is driven in the X,Y,Z directions under the control of a program in a computer control 3, which also controls the movements of the motors M1, M2 about the axes A, B.

The surface sensing device 4 includes an elongate probe holder 8 which extends generally along an axis C, transverse to and intersecting the axis B. This is attached to the articulating head 7 via a housing 9. The housing 9 contains a motor M3 which rotates the probe holder 8 about the axis C, again controlled by the program in the computer control 3.

To enable the exchange of surface sensing devices of different types or configurations, the housing 9 has a kinematic coupling joint 6 of a known type, by which the holder 8 of the surface sensing device 4 is attachable to and detachable from the housing 9. When not in use, surface sensing devices may be stored in ports 34 of a storage rack 30, as illustrated at 4A in FIG. 4. Their exchange is carried out automatically by movements of the CMM arm 26 and the articulating head 7, under the control of the program in the computer control 3. When the surface sensing device 4 is re-attached, the kinematic joint 6 ensures that it is repeatably located with respect to the housing 9, so that the calibration described below need not be repeated each time the surface sensing device is exchanged. The kinematic joint 6 includes magnets (not shown) which hold the surface sensing device in place when in use.

The surface sensing device 4 includes an elongate sensing module 10, containing a surface finish or surface roughness sensor. The module 10 is pivotably attached to the holder 8 by a knuckle joint 12. This enables the module to be oriented manually to a desired set angle with respect to the holder 8, prior to a measurement task. The knuckle joint 12 then holds the module set at this angle by friction, or the joint may have a tightening screw. In order to address different surfaces of a workpiece, the orientation of the module 10 may be further altered under program control during a measurement task, by rotation about the axis C by the motor M3.

Figure 3:
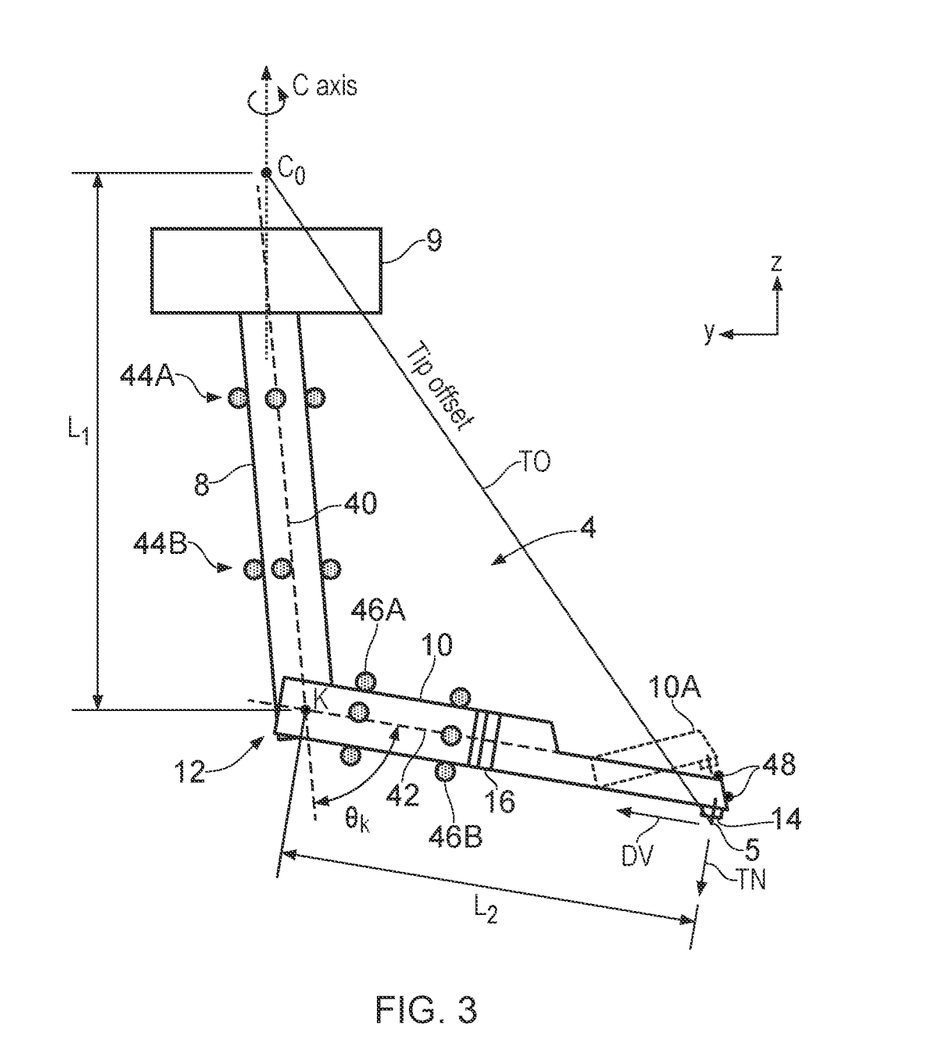
FIG. 3 is a schematic diagram of the geometry of the surface sensing device.

The surface finish or roughness sensor contained in the module 10 may be of a known type, e.g. as described in the above U.S. Pat. Nos. 8,006,399 and 8,468,672. Typically it comprises a surface sensing element in the form of a needle or stylus 5, having a surface-sensing tip which is small compared to the surface irregularities that are to be measured. This is deflectable transversely to the elongate sensing module 10, relative to a skid 14 (FIG. 3). In use, the skid and the stylus tip are dragged across a surface, by X,Y,Z motions of the CMM arm 26, or by rotations of the articulating head 7, under the control of a program in the computer control 3. The stylus 5 is connected to a transducer in the module 10, to measure the resulting deflections of the stylus normal to the surface, thereby indicating its surface finish or surface roughness. The results are sent back and processed in the computer 3.

The holder 8 and sensing module 10 can be provided in numerous different configurations to suit varied measurement tasks. For example, they can be provided in different lengths, or the broken lines 10A in FIG. 3 show that the outer end of the module 10 may be angled in order to better address a surface to be measured. Different types of skid may also be provided to suit different types of measurement.

The sensing module 10 includes a kinematic coupling joint 16, which provides "overtravel" in a known manner. This permits the outer end of the module 10 to deflect against the action of a spring (not shown), to protect it from damage if it accidentally travels too far towards the workpiece and crashes into it. The kinematic joint 16 locates the outer end of the module repeatably so that it returns to the same position after it has been removed out of contact with the workpiece. Since it is not required to be detachable or exchangeable, the joint 16 can be simpler than the kinematic joint 6. It may comprise a spring flexure which normally holds the outer end of the module against a stop.

Prior to use, the geometry of the surface sensing device 4 is calibrated or datumed. The calibration is performed after the elongate sensing module 10 has been manually set to a desired angle at the knuckle joint 12, which can be set approximately using a protractor. The calibration is performed under program control from the control 3. It determines several aspects of the geometry, as seen schematically in FIG. 3:

- The direction and origin of the axis of rotation C in relation to the CMM's coordinate system X,Y,Z. Swash and runout of the axis C may also be determined.
- The axis 40 of the elongate holder 8. This may for example be determined with respect to the axis C. (It will be appreciated that the axis 40 will not coincide precisely with the axis C because of manufacturing tolerances. In FIG. 3 this has been exaggerated for purposes of illustration.)
- The axis 42 of the elongate sensing module 10, giving the point of intersection K of the axes 40,42 at the knuckle joint 12, and a more accurate measurement of the angle $\theta_k$ between these axes.
- A vector TN (tip normal) describing the direction of deflection of the tip 5 (which during subsequent measurements should be aligned with the normal to the surface being measured).
- A vector DV (drag vector) describing the direction along which the tip 5 is dragged along the surface being measured. FIG. 3 shows this as being in the longitudinal direction of the sensing module 10, but if sideways scanning is intended then a drag vector may be calculated laterally to the sensing module (in addition or alternatively to the longitudinal vector.)
- The offset TO (tip offset) of the tip 5 relative to the origin $C_0$ of the axis C.

The calibration may determine all of the individual geometrical aspects listed above, or any of them individually or in any combination, to suit the measurement task which is to be performed.

This calibration will now be described in more detail.

As shown in FIGS. 4-7, a separate touch trigger probe 32 is provided, having a deflectable stylus 36. The probe 32 is fixed with respect to the CMM or other position determining apparatus. Suitably it may be fixed on the storage rack 30. To link the measurements of the surface sensing device 4 to the CMM's coordinate measurement system, the touch trigger probe 32 should desirably have been datumed in the CMM coordinate system. This may be done by probing the tip of its stylus with a reference probe held on the movable arm 26, as is known to those skilled in this field.

Figure 5:
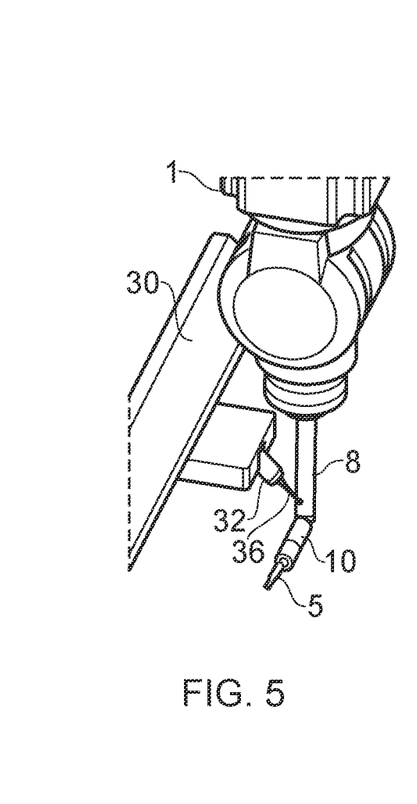
Figure 6:
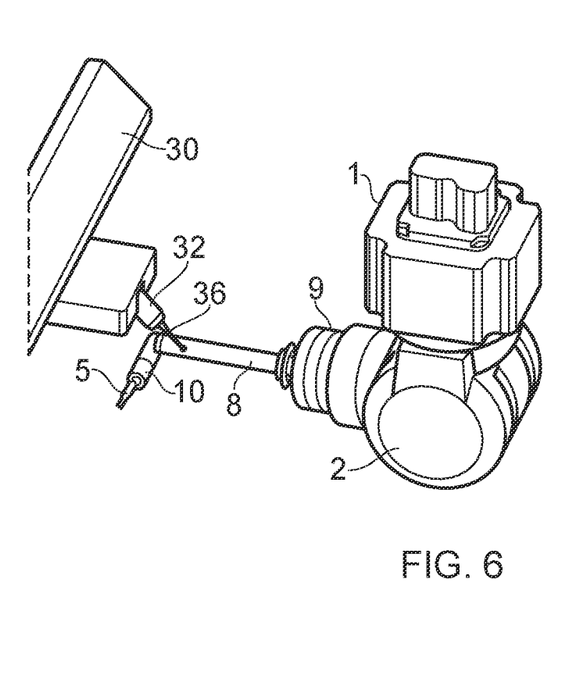
Figure 7:
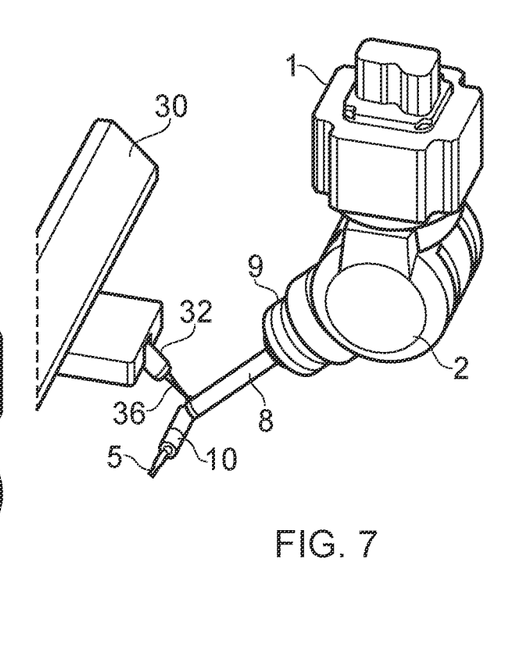

During the calibration of the surface sensing device 4, the holder 8 and module 10 of the surface sensing device (previously set at the desired angle of the knuckle joint 12) are brought into contact with the deflectable stylus 36 of the touch trigger probe 32 in various positions and orientations, under the control of a calibration program in the control computer 3, as shown for example in FIGS. 5, 6 and 7. This contact deflects the stylus 36 and causes the touch trigger probe to issue a trigger signal to the computer control 3.

Preferably, these contacts against the separate touch trigger probe 30 are performed by first orienting the surface sensing device 4 in a desired direction, by rotating the articulating head 7 about its A and B axes. Then the surface sensing device is moved in the linear directions X,Y,Z by driving the CMM on its X,Y,Z axes. On receipt of each trigger signal, the control 3 freezes the readings of the CMM's X,Y,Z position transducers, which indicates the X,Y,Z coordinates of the point on the holder 8 or module 10 which has made contact.

The following measurements all take place with the A and B axes of the articulating head 7 kept in a single orientation.

Referring more particularly to FIG. 3, the C axis is driven to a chosen orientation, e.g. such that the elongate holder 8 and sensing module 10 lie approximately in the Y-Z plane. Then the CMM is driven on its X,Y,Z axes to bring the elongate holder 8 into contact with the touch trigger probe 32 at points 44A, 44B. Suitably these points are on the sides of the holder 8. Readings of the X,Y,Z coordinates are taken of each point. Points should be taken at at least two positions 44A, 44B spaced along the length of the elongate holder. From this the direction of the axis 40 is determined. It is preferable to take at least 6 points in total, since this enables the precise determination of the cylinder defining the holder 8, and hence the direction of its axis 40.

In order to determine the direction of the axis of rotation C and its origin $C_0$, the motor M3 is now operated to rotate the surface sensing device to two or more further orientations about the C axis. For example, the two further orientations may be at 120° from the Y-Z plane. The above procedure to take readings at points 44A, 44B is repeated at each orientation. This gives the direction of the axis 40 at each of three orientations about the C axis, which enables the calculation of the direction and origin of the C axis of rotation, and of the angle of the axis 40 of the elongate holder 8 with respect to the C axis. The swash and runout of the C axis may also be calculated.

If there is confidence that the axis 40 coincides with the C axis of rotation (within a desired tolerance) then it may not be necessary to repeat this determination of the axis 40 at two or more further orientations.

Conveniently, the B axis rotation offset (a zero position of the B axis) may now be set mathematically such that the C axis of rotation (as determined above) lies in the plane defined by the A and B axes when the B axis is in the zero position. This simplifies future measurements.

Next, with the motor M3 of the C axis in one of the above orientations (e.g. the last one measured) points 46A, 46B are taken on the elongate sensing module 10, in the same way as above (suitably on the sides of the module). Like the points 44A, 44B, these points should preferably be at two spaced positions along the length of the module 10, and preferably at least six points are taken in total in order to determine precisely the cylinder defining the module 10. This gives the direction of the axis 42 of the sensing module 10. Knowing the axes 40 and 42 in the chosen orientation, it is straightforward to calculate their point of intersection K at the knuckle joint 12, and an accurate value of the angle $\theta_k$ between these axes.

However, although we prefer six points 46A, 46B at two spaced positions, it may be possible to use less. For example, if the length $L_1$ to the point K is known sufficiently accurately with respect to the C axis origin $C_0$, then it may be possible to determine the axis 42 from that in conjunction with e.g. three points 46B at one position along the module 10. In this case, the determination is based on the fact that the points 46B and the point K are spaced along the length of the module 10.

Furthermore, from the nominal design lengths $L_1$, $L_2$ of the elongate holder 8 and module 10, together with the point K and the knuckle angle $\theta_k$, it is now also straightforward to calculate an approximate value for the tip offset TO of the tip 5 relative to the C axis origin $C_0$. From the knuckle angle $\theta_k$ and the nominal lengths $L_1$, $L_2$, values can be calculated for the tip normal TN and drag vector DV. If it is desired to scan the sensing module 10 sidewise across the surface, then an appropriate drag vector at 90° to the vector DV may be calculated (as well as or instead of the longitudinal vector DV). Of course, if the sensing module has an alternative geometric configuration (such as shown by the broken lines 10A) then the nominal values of the angle(s) and length(s) of this alternative geometry should be taken into account.

During subsequent measurements, the above calibration values enable the tip 5 to be brought into contact with a desired location on a surface of a workpiece of complex shape and measurements to be made, all automatically under program control, without parts of the holder 8 or sensing module 10 fouling or crashing against other surface of the workpiece. The program can be written on the basis of CAD data of the workpiece, without the necessity to manually position the surface sensing device using a joystick control. This is useful, for example, in constricted locations such as a tight groove, or where the workpiece has a blind internal space where it is not possible to see the surface sensing device in order to position it manually with a joystick.

It may be desirable to obtain a more accurate value for the tip offset TO, in order to position the tip 5 precisely at a point on the surface which is to be measured, and to determine the surface topography more precisely. In this case, three or more further points 48 may be taken on the nose of the sensing module 10, in the vicinity of the tip 5. Two such points 48 are shown in FIG. 3—another is hidden since it should be on a different surface of the nose. These points locate the position and orientation of the nose precisely, and the position of the tip 5 can be determined from a knowledge of the nominal design geometry of the tip relative to the nose of the sensing module.

It is not essential for the invention to obtain all of the above calibrations. For example, it may be decided that only some are important, for example the tip normal TN, the drag vector DV and/or the tip offset TO, which affect the accuracy of subsequent measurements, not just the ability to position the surface sensing device without fouling or crashing it. In other cases where there is a greater risk of fouling and crashing, it may be more important to determine the geometry of the surface sensing device by accurately determining the axes 40, 42 and/or the position K and angle $\theta_k$ of the knuckle joint 12.

As mentioned, all the above calibration measurements have been carried out with the A and B axes of the articulating head 7 kept in a single orientation. However, it may be desirable to repeat them at other orientations of the A and B axes, for example as suggested in FIGS. 5, 6 and 7. This may be the case, for example, if the elongate holder 8 and/or the elongate sensing module 10 of the surface sensing device is subject to droop caused by gravity when moved from the vertical position of FIG. 5 to the horizontal position of FIG. 6. Calibration at each position enables the droop to be calibrated out.

It will be appreciated that the geometric calibration described above is separate from any calibration of the transducer in the sensing module 10 which may be carried out.

The above preferred embodiments of the invention have related to surface finish or surface roughness probes of the contact type, having a stylus which is dragged across the surface to be measured. However, the invention may be used with other surface sensing devices, both contact and non-contact types. For example, it can be used with non-contact optical surface finish and surface roughness probes. It can also be used with touch trigger and contact scanning probes. Other non-contact probes include, for example, optical, capacitance and inductance probes. Optical probes include laser spot and laser line probes.

The invention is particularly useful for single axis probes such as optical probes and surface finish or surface roughness probes. This is because for these types of probes especially, rotation about the longitudinal axis (axis C in the above embodiments) greatly increases the number of surfaces the probe can access. Rotation about this axis is also particularly useful for laser line probes as it is possible to rotate the line about the axis of the surface sensing device (the third axis as mentioned above).

The invention claimed is:

1. A unidirectionally-sensing surface sensing device for use in a position determining apparatus, the unidirectionally-sensing surface sensing device being a surface finish or surface roughness probe and comprising:
   first and second elongate members, the first elongate member being mountable to the position determining apparatus, and a pivotable joint connecting the first and second elongate members whereby the second member can be set at a desired angle relative to the first member;
   a skid for contacting the surface, the skid being provided on the second member; and
   a surface sensing element mountable to the position determining apparatus via the first and second elongate members, the surface sensing element being (i) a stylus, which is carried by the second elongate member and projects from the skid so as to deflect relative to the skid in a normal direction when a tip of the stylus is dragged across the surface, and (ii) connected to a transducer to measure the deflection of the stylus relative to the skid thereby to determine the surface finish or surface roughness.

2. The surface sensing device according to claim 1, further comprising a rotary joint configured to rotate the first and second elongate members, which are connected to the position determining apparatus, generally about a longitudinal axis of the first elongate member.

3. The surface sensing device according to claim 1, wherein the surface sensing device is automatically attachable to and detachable from the position determining apparatus via a kinematic coupling joint.

4. The surface sensing device according to claim 1,
   further comprising a kinematic coupling joint, which provides an overtravel mechanism that permits an outer end of the surface sensing element to deflect against action of a spring, thereby protecting the surface sensing element from damage if the surface sensing element accidentally travels too far toward a workpiece and crashes into it,
   wherein the kinematic coupling joint locates the outer end of the surface sensing element repeatably so that the surface sensing element returns to a same position after it has been removed out of contact with the workpiece.

5. A position determining apparatus, comprising the surface sensing device according to claim 1 mounted thereon.

6. A kit for use with a position determining apparatus, the kit including the surface sensing device according to claim 1.

7. The surface sensing device according to claim 2, wherein the rotary joint has a motor for rotating the first elongate member.

8. The position determining apparatus according to claim 5,
wherein the surface sensing device is mounted to the position determining apparatus via an articulating head that is configured to rotate the surface sensing device about two mutually orthogonal axes, and
wherein the articulating head includes motors for rotating the surface sensing device about the mutually orthogonal axes.

9. A method of calibrating a surface sensing device for use in a position determining apparatus,
the surface sensing device comprising:
first and second elongate members mounted to the position determining apparatus, the first elongate member being connected to the position determining apparatus;
a pivotable joint that connects the first and second elongate members whereby the second member can be set at a desired angle relative to the first member; and
a surface sensing element mounted to the position determining apparatus via the first and second elongate members, the surface sensing element being carried by the second elongate member, and
the method comprising:
probing the second elongate member with a separate probe to determine its orientation;
also probing the first elongate member with the separate probe to determine its orientation; and
then determining an angle of the second member relative to the first member.

10. The method according to claim 9, wherein each of the first and second elongate members is probed at at least two positions spaced along its length.

11. The method according to claim 9, wherein the surface sensing device is one that senses unidirectionally.

12. The method according to claim 9,
wherein the surface sensing device includes a rotary joint configured to rotate the first and second elongate members, which are connected to the position determining apparatus, generally about a longitudinal axis of the first elongate member, and
wherein the method comprises determining an orientation of an axis of rotation of the rotary joint.

13. A non-transitory computer-readable medium storing a program for a control computer of a position determining apparatus having a surface sensing device comprising (i) one or more elongate members, which are mounted to the position determining apparatus, and (ii) a surface sensing element mounted to the position determining apparatus via the one or more elongate members, the program being configured to cause the position determining apparatus to perform the method according to claim 9.

14. The method according to claim 10, wherein each of the first and second elongate members is probed at at least six positions spaced along its length.

15. The method according to claim 11, wherein the surface sensing device is a surface finish or surface roughness probe.

16. The method according to claim 11,
wherein the surface sensing element is a stylus with a tip, mounted to deflect in a normal direction when the stylus tip is dragged across a surface, and connected to a transducer to measure the deflection of the stylus thereby to determine surface finish or surface roughness, and
wherein the method includes determining the normal direction of the stylus tip and/or a direction in which the tip is dragged along the surface.

17. A kit for use with a position determining apparatus, the kit including the non-transitory computer-readable medium according to claim 13.

18. The method according to claim 16, comprising determining an offset that describes a location of the stylus tip relative to the position determining apparatus.

* * * * *